Nov. 11, 1952  J. C. HOBBS  2,617,621
VALUE
Filed March 29, 1946

INVENTOR.
JAMES CLARENCE HOBBS
BY Richey + Watts
ATTORNEYS

Patented Nov. 11, 1952

2,617,621

UNITED STATES PATENT OFFICE 2,617,621

VALVE

James Clarence Hobbs, Painesville, Ohio

Application March 29, 1946, Serial No. 658,338

7 Claims. (Cl. 251—31)

The present invention relates generally to valves and more particularly to packless valves of novel construction and great utility and practicability in both high and low pressure fluid systems.

Packless valves are essential in certain systems, such as those operating under vacuum and where any leakage whatever is objectionable and also those wherein exceedingly corrosive or toxic gases are employed, and these valves have therefore been used despite their awkward size and complicated construction. Such valves, furthermore, are desirable in other systems and would be widely used but for these undesirable features. Others skilled in the art have accordingly exerted determined efforts to devise a packless valve not having these shortcomings, but have consistently failed. By virtue of the present invention, however, a packless valve of simple construction and convenient size has been provided and is being used in various forms and meeting with remarkable success. Specifically the valve of this invention includes neither the spring nor the bushing common to many previously known.

This valve, in addition to being free from the short-comings of the prior art devices, is easily and effectively operated even in its smallest form in high pressure systems of substantial pressure-line cross section because of the accessibility of the external valve thread and the mechanical advantage provided by that thread. This mechanical advantage, however, is intentionally limited to prevent damage to the valve seat due to overloading the closure device. Also, the valve is inexpensive, consisting only of a few parts, nearly all of which can be inexpensively manufactured on a screw machine, and can be readily assembled and serviced. Moreover, during use and when the valve-actuating means is not positioned to prevent fluid flow through the valve body, the fluid pressure in the line acts to maintain the valve open and to urge the closure device to the position in which it least interferes with fluid flow through the valve body. At the same time, however, the closure device is prevented from being displaced entirely from operating arrangement when the said means, which comprises a combination cap and handle, is positioned to allow such movement. By adding a spring element only, the valve may be employed under certain circumstances, as an automatic fluid pressure regulator.

Referring to the drawings accompanying and forming a part of this specification:

Figure 1:
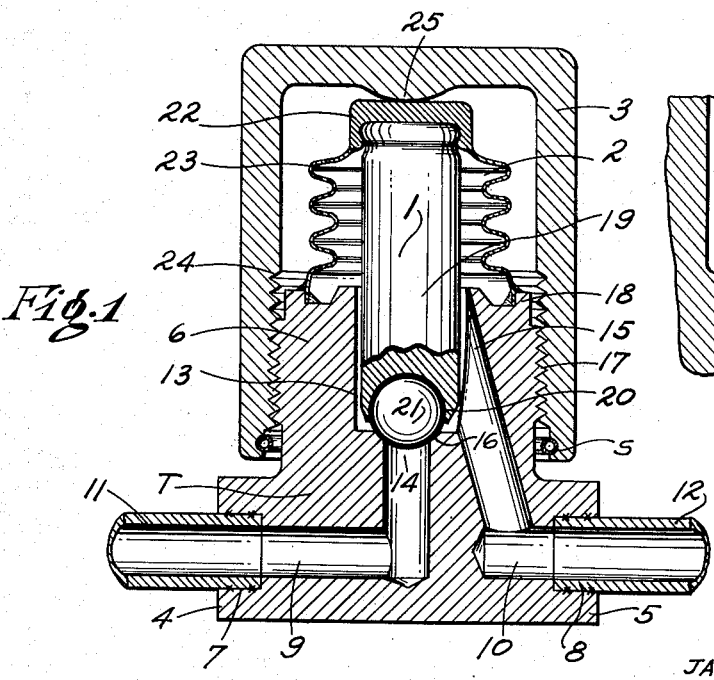
Fig. 1 is a view in elevation and partly in section of one form of valve in the present invention.

The valve of Fig. 1 is comprised of four principal parts, viz., an externally threaded and generally T-shaped valve body T, a closure piece 1, a bellows 2, and a cylindrical internally threaded cap 3.

As illustrated, valve body T consists of cylindrical arms 4 and 5 and cylindrical leg 6. Arms 4 and 5 are provided with axially disposed recesses 7 and 8, respectively, opening into passageways 9 and 10, respectively, and adapted to receive conduits 11 and 12, respectively, in fluid-tight contact. Leg 6 is likewise provided with an axially disposed chamber or recess 13 with which said passageways communicate through ports 14 and 15, thus defining a continuous passage for fluid through the valve body from conduit 11 to conduit 12. Port 14 is provided with a valve seat 16 to receive the closure piece in valve-sealing contact. The leg portion is further provided with external threads 17 along its side and an annular rib 18 situated at its end and disposed axially with respect to recess 13.

Closure piece 1 comprises a cylindrically shaped, elongated stem 19 having a hemispherical recess 20 centrally disposed in one end, and a hard metal ball 21 retained in said recess. In the assembly the stem is disposed partially within recess 13, and ball 21 is engaged with valve seat 16, sealing the valve.

Bellows 2 comprises a shallow, cup-shaped, metal body portion 22 and a cylindrical skirt portion 23 integrally formed with the body portion. Said bellows body portion is carried as a cap by stem 19, being inverted and enclosing the unrecessed end of said stem and being crimped to the stem. The bellows skirt 23 depends from the said body portion and is attached in gas-tight contact to rib 18 of the valve body, thus closing recess 13. The joint between the bellows and the valve body is symmetrical and therefore suitable for induction soldering of the comparatively thick body and the light, thin bellows skirt.

Cap 3 is a cup-shaped element having an internally threaded portion 24 in the vicinity of its open end, and having an axially disposed end wall portion 25 of increased thickness, constituting an internal rounded button-like projection. As shown, cap 3 is engaged with the valve body through threads 17 of said body and threads 24 of said cap, and encloses said bellows. Through end wall portion 25 of the cap, which bears upon bellows body portion 22, cap 3 maintains ball 21 in contact with seat 16 by preventing movement of stem 19 with respect to valve body T. Due to the shape of projection 25 and the nature of its engagement with bellows body 22, substantially no lateral force component is developed on the valve stem when cap 3 is moved to regulate fluid flow through the valve body and there is, therefore, no undesirable tendency for the stem to wobble as in prior valves of the general type.

A small coil spring S is carried in the cap between threads 24 and the open end of the cap. In the assembly of Fig. 1 this spring is shown to interfere with movement of the cap with respect to the valve body to a substantial extent so that a conscious effort would be required to remove the cap from the valve body.

Figure 2:
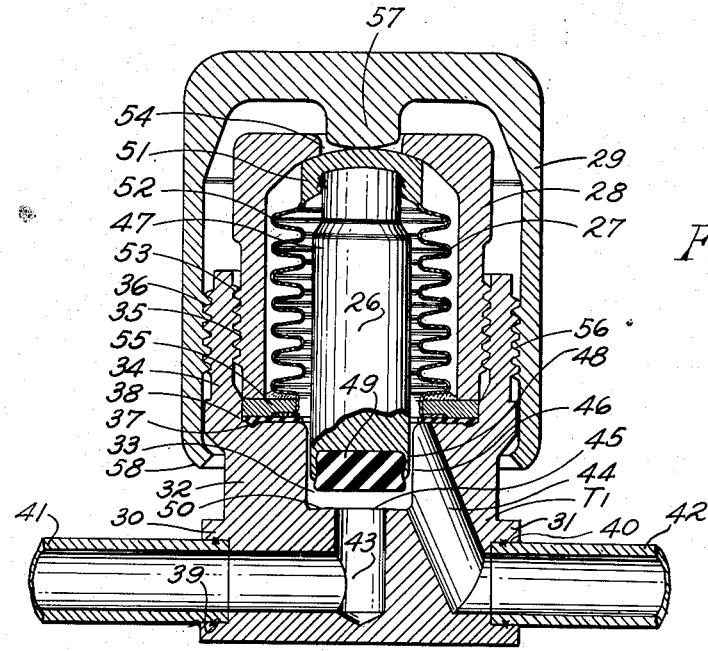
Fig. 2 is similar view of another form of valve of this invention.

The valve of Fig. 2 comprises five principal parts, viz, a generally T-shaped valve body T₁, a closure piece 26, a bellows 27, a bonnet 28, and a cap 29.

Valve body T₁ consists of cylindrical arms 30 and 31 and cylindrical leg 32 which is provided with an axially disposed recess 33 and with an integrally formed, rigid, relatively thin, cylindrical skirt 34 bearing threads 35 on its internal surface and threads 36 on its external surface and having an inside diameter less than the diameter of said leg and an outside diameter greater than that of said leg. In the end surface portion of leg 32, between recess 33 and skirt 34, is a shallow annular depression 37. Overlying most of this end surface portion, including said depression, is an elastomeric, relatively thin, flat gasket ring 38.

Arms 30 and 31 are provided with axially disposed recesses 39 and 40, respectively, which receive conduits 41 and 42, respectively, in fluid-tight contact, and are provided with passageways 43 and 44, respectively. Said passageways communicatively connect said conduits with recess 33, and open into said recess through ports 45 and 46, port 45 serving passageway 43 and being adapted to contact closure piece 26 to prevent flow of fluid from passageway 41 into recess 33.

Closure piece 26 comprises cylindrical, elongated stem 47 having an end portion of reduced diameter and a recess 48 in the opposite end, and an elastomeric disc 49 carried in said recess. As illustrated, stem 47 is disposed vertically and partially within recess 33 with disc 49 out of contact with the portion 50 of the surface of the recess floor immediately encompassing port 45 and serving as the valve seat.

Bellows 39 comprises a cup-shaped, metal body portion 51 and an integrally formed, relatively thin and flexible skirt 52. The body portion in this assembly is carried as a cap by the reduced end portion of stem 47 to which said portion is soldered. The skirt depends from said body portion and is suitably attached to bonnet 28. The joint between the bellows and the bonnet is symmetrical like that of the joint of the bellows and valve body of Fig. 1, and is likewise suitable for induction soldering of the comparatively heavy bonnet and the bellows skirt.

The bonnet 28 is cylindrical and is provided with threads 53 in its outer surface, an axially disposed opening 54 in its top, and a flange 55 at its open end extending radially inward. This element is engaged threadwise with the valve body through threads 53 and threads 35 of valve body skirt portion 34. The shoulder of opening 54 bears upon body 51 of bellows 39 and flange 55 is secured in fluid-tight connection to the open (lower) end of the bellows skirt 52.

Cap 29 is cylindrical and generally cup-shaped and is provided with threads 56 upon its internal surface and an inwardly extending, axially disposed button 59 integrally formed with the closed end of the cap and having a rounded top or contact surface portion. The open end of the cap is provided with an inwardly disposed lip portion 58. In the assembly this cap is engaged with the valve body through threads 36 of the skirt 34 and threads 56, and contacts bellows body 50 through button 59 which extends through opening 54 in bonnet 28. Thus cap 29 encloses bonnet 28, bellows 27 and closure piece 26, in addition to a portion of the valve body including skirt 34, protecting them and cooperating with bonnet 28 and the bellows 27 to prevent substances in the atmosphere from reaching the sealing and seating surfaces and preventing perfect fluid-tight closure of the valve. Here, again, due to the nature of the contact between button 59 and bellows body 50, there is no tendency for the valve stem to wobble when the cap is moved to close the valve even if the cap is not in perfect axial alignment with the stem.

Figure 3:
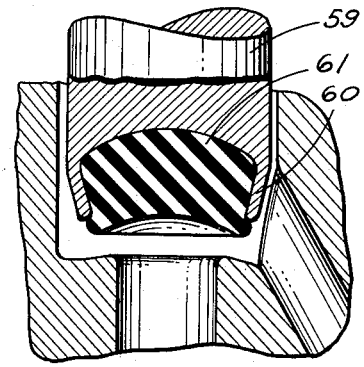
Fig. 3 is an enlarged view partly in section of the assembly of Fig. 2 showing the inlet and outlet ports and surrounding valve body portions and another form of closure piece of my invention.

With reference to Fig. 3, stem 59 corresponds in shape, dimensions, function and effect to that of the stems of Figs. 1 and 2 except that it is provided with a generally U-shaped recess, in cross section and the base is rounded and the walls or skirt 60 of the stem defining the sides of the recess describe an opening which is relatively small in cross section. Elastomeric insert or disc 61 carried in the recess corresponds in function and effect to disc 49 of Fig. 2 but is retained more firmly and securely than said disc, being disposed within the recess so that its center is substantially within the recess with respect to a plane passing through the open end of skirt 60 and so that the disc is tightly pressed against the rounded base of the recess.

The utility and assembly and maintenance advantages of this novel valve closure piece of my invention are obvious and important. In use in the depicted valve assembly the sealing effected with this element is equally as effective as with conventional prior art devices and the closure piece of Fig. 2. Assembly and maintenance are simple and easy, especially as compared to the prior art devices which involve the center screw. The skirt or retaining ring may be crimped, as shown, before or after insertion of the disc in the recess if elastomeric or plastic material such as material rubber or rubberized fabric is used. When a metal ball, such as illustrated in Fig. 1, is to be used as the sealing disc, crimping is suitably done after the ball has been inserted in the recess.

In the use of the valve of Fig. 1, a fluid, the flow of which is to be controlled by the valve, is introduced into the valve body through conduit 11 to passageway 9. With stem 19 disposed to permit passage of the fluid through port 14, the fluid flows into recess 13 and out through port 15 and passageway 10 to conduit 12. The enclosed space or chamber defined by the bellows 2, recess 13 and the valve body is filled with said fluid as flow commences, and the fluid pressure in that chamber corresponds approximately to that in passageway 10 with which said chamber communicates through port 15. As restriction of flow is required, cap 3 is turned to further thread the part upon leg 6, thus urging bellows body portion 22 toward recess 13 and consequently urging valve stem 19 and ball 21 toward valve seat 16. As this motion continues, bellows skirt 23 is compressed in accordion-like manner until finally the surface of ball 21 comprising the sealing ring of the valve engages the valve seat and fluid flow through port 14 is prevented. The valve is opened or adjusted to permit increasing fluid flow by the opposite operation, that is, by rotating cap 3 in the other direction to partially disengage the said threads.

In using the valve of Fig. 2, the fluid is introduced into the valve body through conduit 41 and, in accordance with the disposition of valve closure piece 26, may flow through passageway 43 and port 45 into recess 33 and to conduit 42 through port 46 and passageway 44. As this flow begins, of course, fluid fills recess 33, the cylindrical space within the bellows skirt and the space between the recess and said skirt defined by the bonnet 28, bonnet flange 55 and the valve body T, as it does the corresponding chamber or space in the valve of Fig. 1. The fluid pressure in said chamber and recess 33 closely corresponds to that in passageway 44 which communicates therewith. As flow decreases are desired, the valve closure piece is positioned to accomplish this, and even to entirely prevent fluid flow between conduits 41 and 42 if necessary, by rotation of cap 29 to urge bellows body portion 50 toward port 45 and thus force the valve stem 47 and its elastomeric disc 49 toward said port until the sealing ring, which is a portion of the surface of the elastomeric material, is sufficiently close to the valve seat, which is a portion of the area surrounding port 44, that fluid flow through this port is adequately diminished. Obviously, movement of the cap to open the valve, that is, to remove the sealing ring from the valve seat, is accomplished by rotating the cap in the opposite direction, thus relieving pressure upon the valve stem and permitting movement of the stem and the bellows body away from port 45. Depending upon the disposition of the bonnet, such movement may continue a short or a comparatively long distance but is arrested when the body portion of the bellows engages the shoulder of opening 54 of the bonnet. The position of the bonnet with respect to the valve body and valve stem is, of course, determined before cap 26 is engaged with the valve body to enclose the assembly. Thus in accordance with previously determined desires as to the maximum displacement of the valve closure piece and the maximum fluid flow through the valve body at any time, the bonnet is situated at a greater or lesser distance from the valve seat.

A particularly desirable advantage of the valve of Fig. 2 over that of Fig. 1 is the ease of assembly and disassembly for service and inspection. Whereas, in the valve of Fig. 1 it is necessary to break the seal between the bellows and valve body to inspect the stem, sealing ring and valve seat, and to clean these parts, in the valve of Fig. 2, it is necessary merely to unscrew the cap and bonnet. The cost of this convenience is not particularly large, amounting only to a bonnet having internal as well as external threads and a gasket for sealing these parts when required. The valve of Fig. 1, on the other hand, has the obvious advantage of an easily accessible bellows.

Recesses 7 and 8 of Fig. 1 and 39 and 40 of Fig. 2 are preferably formed with care and with regard to the cross section dimensions of the pipes to be received in them in order that a minimum of time and heat are required to effect the sealing of the valve bodies and pipes. As indicated, the sealing is accomplished with silver solder and the fits are so close that by the induction heating technique soldering is finished quickly and without over heating the valve body and damaging the valve seats or the bellows or bellows joints.

In operation, the two valves are equally effective in containing or excluding fluids, neither of them permitting escape of detectable quantities of fluid of the system or in-leakage of fluid.

It will be obvious to those skilled in the art that in addition to the bellows shown in the illustrated valves, a second or even a third bellows element might be included to provide further assurance that no fluid escape from the valve was possible or that no in-leakage could occur if the system is under a vacuum. Likewise, it will be apparent that a bellows without a body portion, comprising merely a flexible metal cylinder adapted to be compressed and expanded in accordion-like manner and attached to the valve closure piece and the valve body or bonnet, may be employed successfully to accomplish the objects of this invention. The bellows may be multiple ply.

The seal between the bellows skirt and the valve body in the valve of Fig. 1 and between the bellows skirt and the flange of the valve bonnet in the valve of Fig. 2 may be effected by any suitable technique, but preferably is accomplished by soldering. Likewise the bellows cap or body portion may be secured to the valve stem by solder instead of or in addition to the crimp illustrated.

Furthermore, it should be understood that the elastomeric disc 48 which affords an elastomeric sealing ring, might be composed of any suitable rubber-like substances such as natural rubber and the various synthetic rubber and rubber-like materials; and that certain metals, such as lead, which are readily deformable, are also suitable for the purpose. Likewise the ball 21 might be elastomeric or of lead or the like, under certain circumstances, and between the valves of Fig. 1 and Fig. 2 there may be substitution of the sealing ring material. Also, the sealing ring may be formed integrally and homogeneously with the valve stem in either case.

As a matter of practice, in manufacturing the valve of Fig. 1, I have prepared the valve seat by applying force to the valve stem and urging the ball into contact with the port 14 and distorting said port until its surface conforms to the shape of the sealing ring to a limited degree so that a surface, rather than a line, contact between the sealing ring and valve seat can be obtained. Perfect geometric seating is thus assured even when the stem is not in alignment with the axis of the inlet port.

As shown and described, I prefer to use the part under the stem and sealing ring as the inlet part. It is, however, possible and in some instances desirable to use that as the outlet part or alternatively as the inlet and the outlet part, and I contemplate such use.

A further convenient feature of the valve of Fig. 2 is lipped portion 58 of the cap. As is obvious from the illustration, it would be practically impossible unknowingly to remove the cap from engagement with the valve body since conscious effort would be required to force the inwardly disposed lip of the cap over the valve body, which is necessary before the cap can be removed from the engagement with the body. Spring S of the valve of Fig. 1, of course, serves the same purpose and these two means may be combined in one assembly or employed interchangeably with valves of the type herein described or their equivalents. It will be appreciated, though, that as a safety measure to protect the bellows of these valves, these springs or lips are not essential elements of these valves but that they are especially desirable in valves of the Fig. 1 variety which have no bonnet or other secondary bellows protecting device.

Those skilled in the art will appreciate that the illustrated valves may be modified without departing from the spirit of this invention or sacrificing its important advantages by extending the valve stem through the bellows and into direct contact with the cap handle or the valve bonnet, depending upon the form of valve and the individual's preference. In such a valve the stem would suitably be attached, as by welds, to the bellows and the bellows might consist of an open ended, corrugated cylinder or might differ from those herein illustrated except for an opening through the body portion to receive the valve stem.

Having thus described the present invention so that others skilled in the art may be able to understand and practice the same, I state that what I desire to secure by Letters Patent is defined in what is claimed.

What is claimed is:

1. A valve comprising a body having a valve stem recess and inlet and outlet ports leading therefrom, a member movable in the recess to regulate flow of fluid through said recess, means associated with said member and engaged with the valve body for positively moving the member to close the valve, and means cooperating with said body for resiliently moving said member to open said valve, said valve opening means comprising a single piece metal bellows secured to said member and having fluid sealing engagement with said body and having a wall portion of increased thickness contacting said member and the member-moving means.

2. A valve comprising a body having a valve stem recess and inlet and outlet ports leading therefrom, a member movable in the recess to regulate flow of fluid through said recess, means rotatable relative to and associated with said member and engaged with the valve body for positively moving the member to close the valve, and means cooperating with said body for resiliently moving said member to open said valve, said valve opening means comprising a single piece metal bellows secured to said member and having fluid sealing engagement with said body and having an end wall of increased thickness contacting said member and the member-moving means.

3. A valve comprising a body having a valve stem recess and inlet and outlet ports leading therefrom, a member movable in the recess to regulate flow of fluid through said recess, means associated with said member and engaged with the valve body for positively moving the member to close the valve, and means cooperating with said body for resiliently moving said member to open said valve, said valve opening means consisting of a single piece metal bellows secured to said member and having fluid sealing engagement with said body and having an end wall portion of increased thickness contacting said member and the member-moving means.

4. A valve comprising a body having a valve stem recess and inlet and outlet ports leading therefrom, a member movable in the recess to regulate flow of fluid through said recess, means rotatable relative to and associated with said member and engaged with the body for positively moving the member to close the valve, and means cooperating with said body for resiliently moving said member to open said valve, said valve opening means comprising a single piece metal bellows having a skirt portion welded to said body around said member and around one of said outlet ports and having a body portion of increased thickness engaged with the rotatable member-moving means and secured to said member for movement therewith.

5. A valve comprising a body having a valve stem recess and inlet and outlet ports leading therefrom, a member movable in the recess to regulate flow of fluid through said recess, means rotatable relative to and associated with said member and engaged with the valve body for positively moving the member to close the valve, means cooperating with said body for resiliently moving said member to open said valve, said valve opening means comprising a single piece metal bellows secured to said member, said bellows being generally cup shaped and having an end wall of increased thickness contacting said valve member and contacting said rotatable member-moving means, means for limiting movement of said member toward its open position comprising a bonnet screwed onto the body and secured fluid tightly to the valve opening means, and means comprising an elastomeric gasket fluid-sealingly engaging said body and valve opening means.

6. A valve comprising a body having a recess provided with an open end and inlet and outlet ports, a valve movable in said recess to regulate flow of fluid between said ports, said valve including a stem, a cap adjustably connected to the body for actuating said valve stem endwise in one direction to close the valve, and a bellows secured at one end to said body and at the other end to said stem and enclosing said open end of the recess and the valve stem, said bellows serving to actuate the stem endwise in the opposite direction to open the valve, said bellows having a thickened end wall overlying the end of said stem.

7. A valve comprising a body having a recess provided with an open end and inlet and outlet ports, a valve movable in said recess to regulate flow of fluid between said ports, said valve including a stem, a cap adjustably connected to the body for actuating said valve stem endwise in one direction to close the valve, a bellows secured at one end to said body and at the other end to said stem and enclosing said open end of the recess and the valve stem, said bellows serving to actuate the stem endwise in the opposite direction to open the valve, and means for limiting the extent of valve opening movement of the valve stem comprising a bonnet connected to said body within said cap and outside of said bellows, said bellows having a thickened end wall overlying the end of said stem.

JAMES CLARENCE HOBBS.

REFERENCES CITED

The following references are of record in the file of this patent:

UNITED STATES PATENTS

| Number | Name | Date |
|---|---|---|
| 935,842 | Foley | Oct. 5, 1909 |
| 1,252,702 | Kelly | Jan. 8, 1918 |
| 1,773,110 | Meyers | Aug. 19, 1930 |
| 1,859,834 | May | May 24, 1932 |
| 1,956,027 | Heitman | Apr. 24, 1934 |
| 1,992,902 | McIntosh | Feb. 26, 1935 |
| 2,001,251 | Irving | May 14, 1935 |
| 2,044,443 | Ott | June 16, 1936 |
| 2,068,626 | Clifford | Jan. 19, 1937 |
| 2,122,398 | Harrison | July 5, 1938 |
| 2,280,499 | Perkins | Apr. 21, 1942 |
| 2,388,046 | Emerich | Oct. 30, 1945 |

FOREIGN PATENTS

| Number | Country | Date |
|---|---|---|
| 5,303 | Switzerland | of 1892 |